United States Patent
Martin et al.

(10) Patent No.: US 11,556,473 B2
(45) Date of Patent: Jan. 17, 2023

(54) CACHE MEMORY MANAGEMENT

(71) Applicant: EMC IP Holding Company LLC, Hopkinton, MA (US)

(72) Inventors: Owen Martin, Hopedale, MA (US); Vladimir Desyatov, Hollis, NH (US); Michael Scharland, Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 141 days.

(21) Appl. No.: 16/942,864

(22) Filed: Jul. 30, 2020

(65) Prior Publication Data

US 2022/0035743 A1 Feb. 3, 2022

(51) Int. Cl.
*G06F 12/0846* (2016.01)
*G06N 5/04* (2006.01)
*G06N 20/00* (2019.01)

(52) U.S. Cl.
CPC .......... *G06F 12/0848* (2013.01); *G06N 5/04* (2013.01); *G06N 20/00* (2019.01); *G06F 2212/608* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24;
(Continued)

(56) References Cited

U.S. PATENT DOCUMENTS 5,434,992 A * 7/1995 Mattson .............. G06F 12/0848
711/119
6,341,331 B1 * 1/2002 McNutt ............... G06F 12/0866
711/E12.019
(Continued)

OTHER PUBLICATIONS

S. Khan, A. R. Alameldeen, C. Wilkerson, O. Mutluy and D. A. Jimenezz, "Improving cache performance using read-write partitioning," 2014 IEEE 20th International Symposium on High Performance Computer Architecture (HPCA), 2014, pp. 452-463 (Year: 2014).*
(Continued)

*Primary Examiner* — Daniel C. Chappell
(74) *Attorney, Agent, or Firm* — Krishnendu Gupta; Nikhil Patel

(57) ABSTRACT

Embodiments of the present disclosure relate to cache memory management. One or more global caches are dynamically partitioned and sized into one or more cache partitions based on anticipated input/output (IO) workloads.

14 Claims, 5 Drawing Sheets

(58) Field of Classification Search
CPC .......... G11B 33/00–1493; G11C 11/00–5692;
G11C 13/00–06; G11C 14/00–009; G11C
15/00–06; G11C 16/00–3495; G11C
17/00–18; G11C 2207/00–229; G11C
2216/00–30; H01L 25/00–50; H01L
27/00–3293; H01L 2225/00–1094; H03M
7/00–707; H04L 9/00–38; H04L
12/00–66; H04L 41/00–5096; H04L
49/00–9094; H04L 61/00–6095; H04L
67/00–42
See application file for complete search history.

(56) References Cited

U.S. PATENT DOCUMENTS

| | | | | |
|---|---|---|---|---|
| 9,135,123 | B1* | 9/2015 | Armangau | G06F 16/172 |
| 9,223,710 | B2* | 12/2015 | Alameldeen | G06F 12/0864 |
| 9,767,021 | B1* | 9/2017 | Wu | G06F 12/126 |
| 2007/0094213 | A1* | 4/2007 | Lai | G06N 7/005 |
| | | | | 706/52 |
| 2009/0248985 | A1* | 10/2009 | Ayguade | G06F 8/4442 |
| | | | | 711/E12.016 |
| 2010/0064205 | A1* | 3/2010 | Moyer | G06F 12/126 |
| | | | | 714/E11.006 |
| 2015/0046656 | A1* | 2/2015 | Blinick | G06F 12/08 |
| | | | | 711/129 |
| 2015/0339229 | A1* | 11/2015 | Zhang | G06F 3/0631 |
| | | | | 711/130 |
| 2016/0062899 | A1* | 3/2016 | Cain, III | G06F 9/461 |
| | | | | 711/125 |
| 2016/0232043 | A1* | 8/2016 | Malnati | G06F 11/0721 |
| 2018/0357537 | A1* | 12/2018 | Munkberg | G06N 3/063 |
| 2021/0216460 | A1* | 7/2021 | Barbalho | G06F 12/0848 |
| 2022/0180162 | A1* | 6/2022 | Han | G06F 12/0842 |

OTHER PUBLICATIONS

T. Huang et al., "Combining Process-Based Cache Partitioning and Pollute Region Isolation to Improve Shared Last Level Cache Utilization on Multicore Systems," IEEE International Conference on Trust, Security and Privacy in Computing and Communications, pp. 1153-1160, doi: 10.1109/TrustCom.2013.139 (Year: 2013).*

Y. Zhang, Z. Ling, R. Cui, M. Lv, N. Guan and Q. Deng, "Detecting and Predicting Performance Degradation Caused by Impaired Cache Isolation," 2019 IEEE 37th International Conference on Computer Design (ICCD), 2019, pp. 680-683, doi: 10.1109/ICCD46524.2019.00099. (Year: 2019).*

G. Gracioli and A. A. Frohlich, "An experimental evaluation of the cache partitioning impact on multicore real-time schedulers," 2013 IEEE 19th International Conference on Embedded and Real-Time Computing Systems and Applications, 2013, pp. 72-81, doi: 10.1109/RTCSA.2013.6732205. (Year: 2013).*

D. Tsigkari, G. Iosifidis and T. Spyropoulos, "Split the cash from cache-friendly recommendations," 2021 IEEE Global Communications Conference (GLOBECOM), 2021, pp. 1-6, doi: 10.1109/GLOBECOM46510.2021.9685088. (Year: 2021).*

* cited by examiner

500 dynamically partitioning and sizing one or more global caches into one or more cache partitions based on anticipated I/O workloads

CACHE MEMORY MANAGEMENT

BACKGROUND

Memory management is a form of resource management applied to computer memory. Memory management can be used to provide ways to dynamically allocate portions of memory to programs at their request, and free it for reuse when no longer needed. Enabling more efficient memory management can be important to computer systems where more than a single process might be underway at any time.

SUMMARY

Embodiments of the present disclosure relate to cache memory management. One or more global caches are dynamically partitioned and sized into one or more cache partitions based on anticipated input/output (IO) workloads.

In embodiments, each of the one or more mirrored and un-mirrored caches can be segmented into one or more cache pools. Each of the cache pools can have a distinct size.

In embodiments, the one or more cache partitions can be partitioned along at least two dimensions. Further, a first dimension can correspond to an input/output (IO) operation type and a second dimension can correspond to an IO size.

In embodiments, the IO operation type can include at least one of: a read operation and a write operation. In further embodiments, the IO operations can be portioned into one or more bins. The bins can also be sized based on anticipated IP operation sized (e.g., 128k, 64k, and 16k sizes).

In embodiments, a first set and a second set of the one or more partitions can be provisioned to cache write IO operations. The second set of the partitions can be mirrored cache partitions of the first set.

In embodiments, a third set of the one or more cache partitions can be provisioned as unmirrored caches adapted to cache read IO operations.

In embodiments, each of the first, second, and third sets of partitions can be provisioned with one or more cache bins. Each bin can be a smaller unit of memory than a partition.

In embodiments, each IO operation of an IO workload can be assigned to one or more of the partitions based on a similarity between a size of each IO operation and the configured caching IO operation size of each partition.

In embodiments, IO workloads of each of the partitions can be anticipated using one or more machine learning techniques.

In embodiments, the anticipated IO workload can be clustered into groups of IO operations corresponding to the first and second dimensions. Additionally, cache sizes required to cache each of the groups of IO operations can be determined. Further, the one or more global caches can be partitioned and sized into the one or more cache partitions based on the groups of IO operations and determined sizes.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 5 is a flow diagram of a method for partitioning and sizing cache memory in accordance with example embodiments disclosed herein.

DETAILED DESCRIPTION

Storage devices can include global memory configured to store data to facilitate certain storage device operations. The operations can require that the stored data be easily and quickly accessible. Accordingly, the global memory can include volatile (e.g., non-persistent) cache memory having mirrored and unmirrored cache slots having fast data read/write response times. Data stored in mirrored cache slots are copied in cache slots of other storage devices to, e.g., provide a solution for rapid, reliable, robust, automatic failover. Data stored in unmirrored cache slots are not copied. Generally, write data is stored in mirrored cache slots, while read data is stored in unmirrored cache slots because the read data is an inherent copy of data stored in a storage device's disk (e.g., persistent memory).

The storage devices can use memory management techniques to store input/output (IO) operations into the mirrored or unmirrored caches. Current naïve memory management techniques use statically sized cache slots, which can result in inefficient memory utilization. For example, an 8K sized cache pool may be full and, thus, an 8K IO operation may need be stored in, e.g., a cache slot of a 128K cache. Accordingly, the 128K cache slot would be underutilized as it would have 120k of available space that cannot be used until the 8K IO operation is processed by the storage device.

Embodiments of the present disclosure relate to cache memory management techniques that can increase storage system performance (e.g., response times) and lower costs by forecasting workload parameters to dynamically partition and size cache memory as described in greater detail below.

Figure 1:
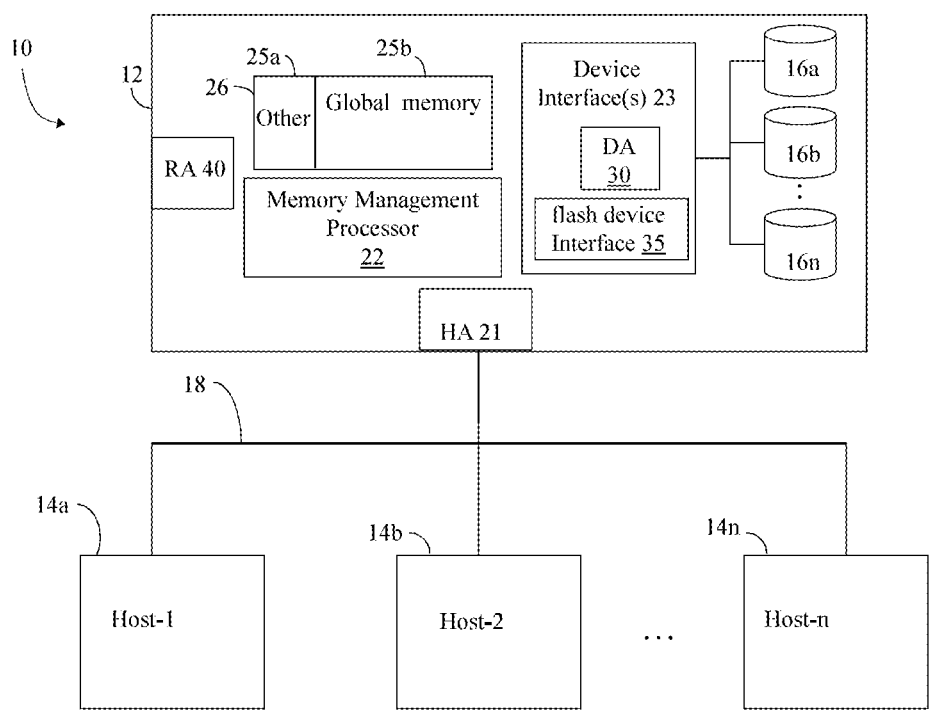
FIG. 1 is a block diagram of an example a storage system in accordance with example embodiments disclosed herein.

Referring to FIG. 1, shown is an example system 10 that may be used in connection with performing embodiments of the present disclosure described herein. The system 10 includes a data storage system 12 connected to host systems 14a-n through communication medium 18. In embodiments, the hosts 14a-n can access the data storage system 12, for example, to perform input/output (IO) operations or data requests. The communication medium 18 can be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host 14a-n can access and communicate with the data storage system 12. The hosts 14a-n can also communicate with other components included in the system 10 via the communication medium 18.

Each of the hosts 14a-n and the data storage system 12 can be connected to the communication medium 18 by any one of a variety of connections as may be provided and supported in accordance with the type of communication medium 18. The processors included in the hosts 14a-n may be any one of a variety of proprietary or commercially available single or multi-processor system, such as an Intel-based processor, or other type of commercially available processor able to support traffic in accordance with each embodiment and application.

It should be noted that the examples of the hardware and software that may be included in the data storage system 12 are described herein in more detail and can vary with each embodiment. Each of the hosts 14a-n and data storage system 12 can all be located at the same physical site or can be located in different physical locations. Examples of the communication medium 18 that can be used to provide the different types of connections between the host computer systems and the data storage system of the system 10 can use a variety of different communication protocols such as SCSI, Fibre Channel, iSCSI, and the like. Some or all the connections by which the hosts 14a-n and data storage system 12 can be connected to the communication medium may pass through other communication devices, such switching equipment that may exist such as a phone line, a repeater, a multiplexer or even a satellite.

Each of the hosts 14a-n can perform different types of data operations in accordance with different types of tasks. In embodiments, any one of the hosts 14a-n may issue a data request to the data storage system 12 to perform a data operation. For example, an application executing on one of the hosts 14a-n can perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the embodiments herein. It should also be noted that an embodiment may include data storage arrays or other components from one or more vendors. In subsequent examples illustrated the embodiments herein, reference may be made to a single data storage array by a vendor, such as by DELL Technologies of Hopkinton, Mass. However, as will be appreciated by those skilled in the art, the embodiments herein are applicable for use with other data storage arrays by other vendors and with other components than as described herein for purposes of example.

The data storage system 12 may be a data storage array including a plurality of data storage devices 16a-n. The data storage devices 16a-n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory based SSDs are one type of SSD that contains no moving parts. The embodiments described herein can be used in an embodiment in which one or more of the devices 16a-n are flash drives or devices. More generally, the embodiments herein may also be used with any type of SSD although following paragraphs can refer to a particular type such as a flash device or flash memory device.

The data storage array 12 may also include different types of adapters or directors, such as an HA 21 (host adapter), RA 40 (remote adapter), and/or device interface 23. Each of the adapters HA 21, RA 40 may be implemented using hardware including a processor with local memory with code stored thereon for execution in connection with performing different operations. The HA 21 may be used to manage communications and data operations between one or more host systems 14a-n and the global memory (GM) 25b. In an embodiment, the HA 21 may be a Fibre Channel Adapter (FA) or another adapter which facilitates host communication. The HA 21 may be characterized as a front-end component of the data storage system 12 which receives a request from one or more of the hosts 14a-n. The data storage array 12 can include one or more RAs (e.g., RA 40) that may be used, for example, to facilitate communications between data storage arrays. The data storage array 12 may also include one or more device interfaces 23 for facilitating data transfers to/from the data storage devices 16a-n. The data storage interfaces 23 may include device interface modules, for example, one or more disk adapters (DAs) 30 (e.g., disk controllers), flash drive interface 35, and the like. The DA 30 can be characterized as a back-end component of the data storage system 12 which interfaces with the physical data storage devices 16a-n.

One or more internal logical communication paths may exist between the device interfaces 23, the RAs 40, the HAs 21, and the memory 26. An embodiment, for example, may use one or more internal busses and/or communication modules. For example, the global memory 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The data storage system as described in this embodiment, or a device thereof, such as a disk or aspects of a flash device, should not be construed as a limitation. Other types of commercially available data storage systems, as well as processors and hardware controlling access to these devices, may also be included in an embodiment.

Host systems 14a-n provide data and access control information through channels to the storage systems 12, and the storage systems 12 may also provide data to the host systems 14a-n also through the channels. The host systems 14a-n do not address the drives or devices 16a-n of the storage systems directly, but rather access to data can be provided to one or more host systems 14a-n from what the host systems view as a plurality of logical devices or logical volumes (LVs). The LVs may or may not correspond to the actual physical devices or drives 16a-n. For example, one or more LVs may reside on a single physical drive or multiple drives. Data in a single data storage system, such as a single data storage array 12, may be accessed by multiple hosts allowing the hosts to share the data residing therein. The HA 21 may be used in connection with communications between a data storage array 12 and one or more of the host systems 14a-n. The RA 40 may be used in facilitating communications between two data storage arrays. The DA 30 may be one type of device interface used in connection with facilitating data transfers to/from the associated disk drive(s) 16a-n and LV(s) residing thereon. A flash device interface 35 may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA 30, performs IO operations on a drive 16*a-n*. In the following description, data residing on an LV may be accessed by the device interface following a data request in connection with IO operations that other directors originate. Data may be accessed by LV in which a single device interface manages data requests in connection with the different one or more LVs that may reside on a drive 16*a-n*. For example, a device interface may be a DA 30 that accomplishes the foregoing by creating job records for the different LVs associated with a device. These different job records may be associated with the different LVs in a data structure stored and managed by each device interface.

A memory management processor 22 can manage use of the global memory 25*b* by, e.g., dynamically partitioning and sizing the global memory's mirrored and unmirrored caches (e.g., mirrored cache 205 and unmirrored cache 210 of FIG. 2) as described in greater detail in the following paragraphs.

In embodiments, the memory management processor 22 can exist external to the data storage system 12. Accordingly, the processor 22 may communicate with the data storage system 12 using any one of a variety of communication connections. In one embodiment, the memory management processor 22 can communicate with the data storage system 12 through, e.g., a serial port, a parallel port and a network interface card to establish, e.g., an Ethernet connection. Using the Ethernet connection, for example, a memory management processor may communicate directly with DA 30 and HA 21 within the data storage system 12.

Figure 2:
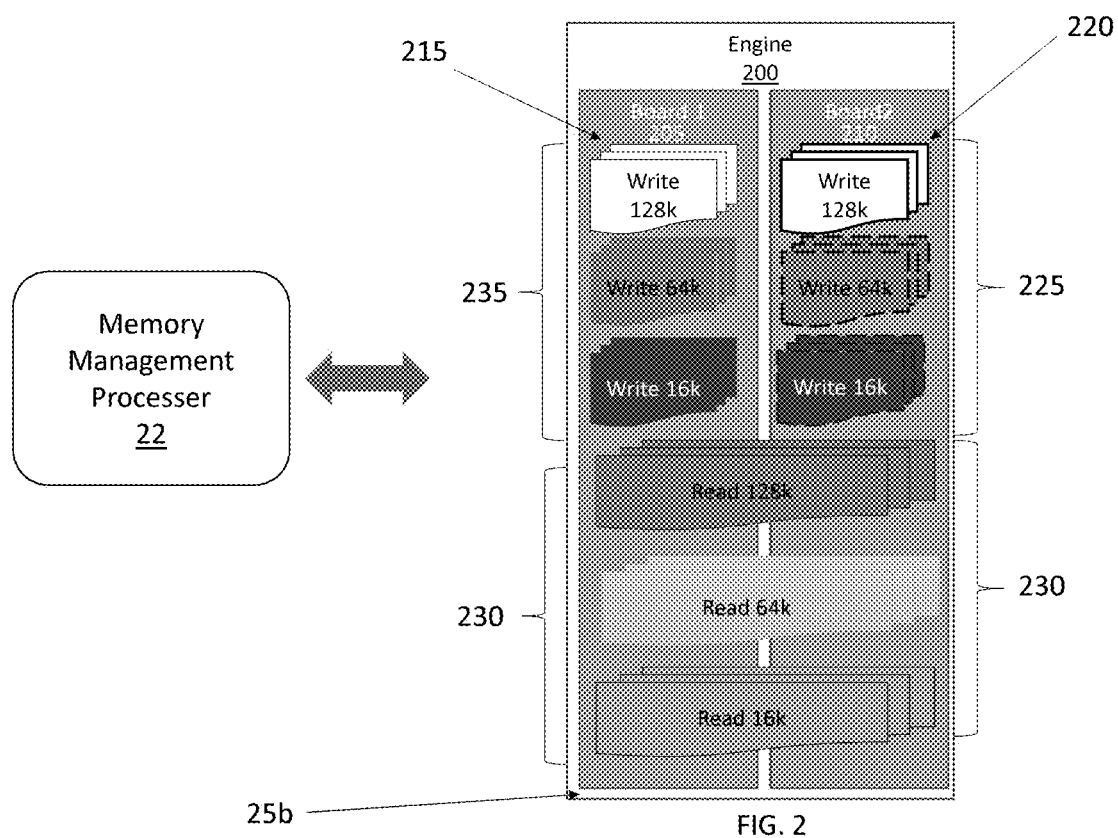
FIG. 2 is a block diagram of a memory management processor (MMP) in accordance with example embodiments disclosed herein.

Referring to FIG. 2, a memory management processor 22, e.g., of FIG. 1, can be configured to manage global memory 25*b* of, e.g., the storage device 12 of FIG. 1. The storage device 12 can include an engine 200 comprising one or more boards such as boards 205-210 that supply the global memory 25*b*. The global memory 25*b* can include cache memory 215 stored on a first board 205 and cache memory 220 stored on a second board 210.

In embodiments, the memory management processor 22 can establish one of the boards, e.g., the first board 205 as primary cache global memory 215. Further, the processor can establish the other board, e.g., the second board 220 as a backup cache global memory 220. In further embodiments, the processor 22 can establish write cache memory 235 on the first board 205 and mirrored write cache memory 220 on the second board 210. To provide a greater supply for write cache memory, the processor 22 can also establish a single read cache memory 230 that can be supplied by either the first or second boards 205-210. In embodiments, the processor 22 can establish the read cache memory 230 to be included with the primary cache global memory 215. In circumstances where access to the primary cache global memory 215 is disrupted, the memory manager 22 can utilize disk storage (e.g., disks 16*a-n*) to obtain data that may have been stored on the read cache memory 230.

In embodiments, the memory management processor 22 can be any one of a variety of commercially available processors, such as an Intel-based processor, and the like. In embodiments, the memory management processor 22 can be a parallel processor such as a graphical processing unit (GPU). Although what is described herein shows details of software that may reside in the memory management processor 22, all or portions of the illustrated components may also reside elsewhere such as on, for example, HA 21 of FIG. 1.

Figure 3:
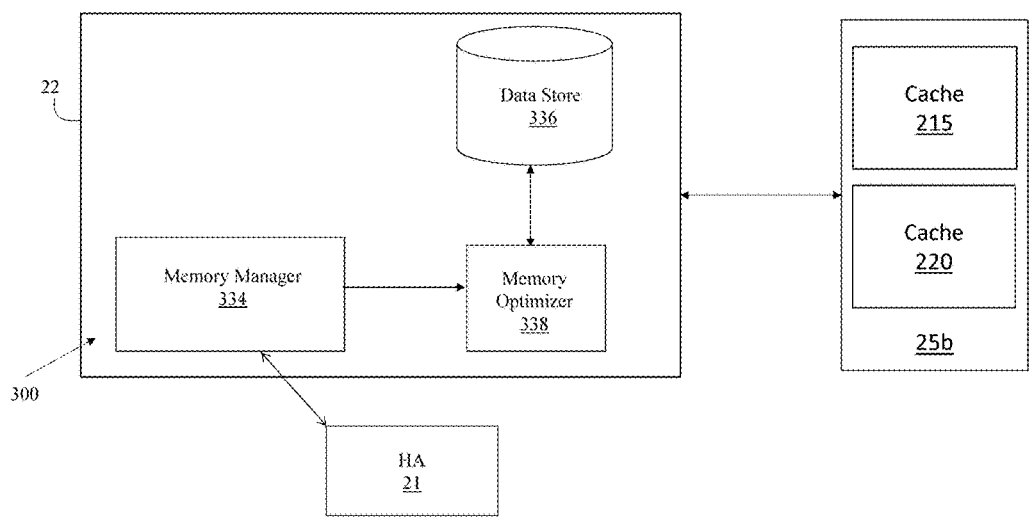
FIG. 3 is a block diagram of an engine of a storage system in accordance with example embodiments disclosed herein.

Referring to FIG. 3, the memory management processor 22 can include circuitry and/or logic 300 configured to manage global memory 25*b*. In embodiments, the processor 22 can include memory manager 334 that can gather and store memory status data of, e.g., global memory 25*b* and workload data received by HA 21 in data store 336. The memory status data can include memory class information, capacity information, metadata regarding data units stored in each unit of memory, cache pool types and sizes, and cache slot segment sizes amongst other known types of memory status data. The manager 334 can also monitor input/output (IO) streams that include operations such as read/write operations received by HA 21. By analyzing the IO streams, the manager 334 can anticipate IO workloads that the storage device 12 can expect to receive in one or more time-windows (e.g., current and/or future).

Based on one or more of the anticipated workloads, a customer's SLA, and memory status data, a memory optimizer 338 can dynamically partition one or more of the caches 215-220 of the storage device's global memory 25*b*. For example, the optimizer 338 can re-allocate amounts of cache assigned to the each of the global memory's mirrored segments 225,235 and unmirrored cache segments 230 based on the anticipated workloads.

In embodiments, the processor 22 can partition the cache segments 225, 230, 235 along one or more dimensions. For example, the processor 22 can partition the cases along a first dimension corresponding to IO type (e.g., read or write operation) and a second dimension corresponding to a track size of each IO operation included in an IO stream (e.g., workload). By partitioning the cache segments cache segments 225, 230, 235 along one or more dimensions, the processor 22 can advantageously provide higher memory resolution and optimization, while also avoiding wasted cache segments that mirror read operations.

In embodiments, the manager 334 can sample cache memory storage groups of each of the cache segments 225, 230, 235 over a predetermined and or dynamically established interval. The manager 3344 can also group IO workloads into clusters of IO operations based on IO type and track size of each IO operation (e.g., the first and second dimensions). Further, the manager 334 can establish cache slots (e.g., bins) based on each cluster's properties corresponding to the first and second dimensions.

Using one or more machine learning (ML) techniques, the memory manager 334 can further analyze historical and current IO workloads to anticipate IO workloads that the storage device 12 can expect to receive in one or more future time-windows. In embodiments, the manager 334 can use the ML techniques to analyze workloads corresponding to each of the bins. Thus, the memory manager 334 can define the anticipated workloads based on IO types, IO sizes, track sizes, and SLs associated with each IO, activity types, amongst other parameters and patterns of each parameter (e.g., frequency). Activity types can be one or more of Online Transaction Processing (OLTP), Teradata, random, and sequential IO streams.

In embodiments, the manager 334 can use a recurring neural network (RNN) to analyze the historical and current IO workloads. The RNN can be a Long Short-Term Memory (LSTM) network that anticipates the workloads based on historical/current IO workload input parameters. Further, the ML techniques can include a time series learning logic to anticipate the workloads. The manager 334 can use parameters such as include IO types and sizes, logical block address (LBA), response times, IO data types, IO payloads, and time of any observed IO pattern, amongst other input parameters for ML analysis.

In embodiments, the manager 334 can establish one or more cache memory partition models using results of the ML analysis.

For example, a first model can correspond to a first anticipated workload expected the manager 334 expects the storage device 12 to receive during a first time-window. The first time-window can, e.g., correspond to a period during operational business hours of a customer. During the first time-window, model may define the first anticipated workload to include a larger percentage of write vs read IO operations. As stated herein, write data is generally stored in mirrored cache slots to ensure copies exist in case of an error caused by, e.g., power loss, failover, and a data breach, amongst other factors. Accordingly, the memory management processor may allocate a greater number of cache slots (bins) to the global memory's mirrored segment 305 vs the global memory's unmirrored segment 225.

Further, the memory management processor may predict that the first anticipated write workload is likely to include, from greatest to lowest in frequency, write IO sizes of 8K, 64K, and 128K. Similarly, the processor may predict that the first anticipated read workload is likely to include, from greatest to lowest in frequency, read IO sizes of 64K, 128K, and 8K. Based on the predicted read/write workloads, the processor allocates cache slot bins to each of the cache segments 225, 230, 235 being sized according to the IO sizes (e.g. track sizes).

Further, a second model re-partition the mirrored and unmirrored memory segments 225, 230, 235 based on, e.g., a second anticipated workload expected to be received during a second time-window. The second time-window can correspond to, e.g., end of day business operations of the customer. During the second time-window, the second model define the second anticipated workload as including a larger percentage of read vs write IO operations. As stated herein, read data is generally stored in unmirrored cache slots because the data is typically read from disk, which inherently includes original copies of the read data. Accordingly, the memory management processor may allocate a greater portion to global memory's unmirrored segment 230 rather than the global memory's mirrored segments 225, 235.

Further, first model may predict that the first anticipated write workload is likely to include, from greatest to lowest in frequency, write IO sizes of 128K, 8K, and 64K. Similarly, the second model may predict that the second anticipated read workload is likely to include, from greatest to lowest in frequency, read IO sizes of 64K, 16K, and 8K. Based on the predicted read/write workloads defined by each of the models, the optimizer 338 can repartition and/or reallocate cache slot bins to each of one or more of the cache segments 225, 230, 235.

In embodiments, the optimizer 338 can use memory partition models to partition and/or repartition the bins of each cache memory segment 225, 230, 235. For example, the manager 334 can establish a searchable data structure that associates each anticipated workload characteristic to one or more of the cache models. The optimizer 338 can monitor the IO workloads using the anticipated workload characteristics to determine a characteristic of a workload. Based on the workload characteristic, the optimizer 338 can identify one or more of the models that are associated with the determined workload characteristic. Using the identified one or more models, the optimizer 338 can dynamically partition the cache segments 225, 230, 235.

Figure 4:
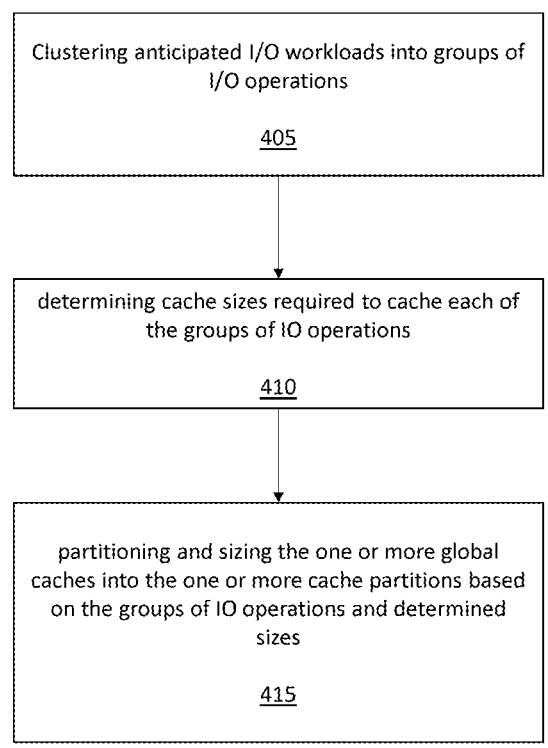
FIG. 4 is a flow diagram of a method for cache memory management in accordance with example embodiments disclosed herein.

FIGS. 4-5 illustrate methods and/or flow diagrams per this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter.

Referring to FIG. 4, in embodiments, a method 400 can be executed by a memory management processor (e.g., the memory management processor 22 of FIG. 1). At 405, the method 400 can include clustering an anticipated IO workload into groups of IO operations corresponding to first and second dimensions. The method, 400, at 410, can also include determining cache sizes required to cache each of the groups of IO operations. Further, at 415, the method 400 can include partitioning and sizing the one or more global caches into the one or more cache partitions based on the groups of IO operations and determined sizes.

It should be noted that the method 400 can be performed according to any of the embodiments described herein, known to those skilled in the art, and/or yet to be known to those skilled in the art.

Referring to FIG. 5, in embodiments, a method 500 can be executed by a memory management processor (e.g., the memory management processor 22 of FIG. 1). At 505, the method 500 can include dynamically partitioning and sizing one or more global caches into one or more cache partitions based on anticipated input/output (IO) workloads.

It should be noted that the method 500 can be performed according to any of the embodiments described herein, known to those skilled in the art, and/or yet to be known to those skilled in the art.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described embodiments can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described embodiments can be implemented in a distributed computing system that includes a back-end component. The back-end component can, for example, be a data server, a middleware component, and/or an application server. The above described embodiments can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the concepts described herein may be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. An apparatus comprising a memory and at least one processor configured to:
    dynamically partition and size one or more global caches into one or more cache partitions based on anticipated input/output (IO) workloads, wherein the one or more global caches include a primary cache and a backup cache; and
    establish the cache partitions to include one or more write cache memory partitions and a read cache memory partition wherein the one or more cache partitions are partitioned along at least two dimensions, wherein a first dimension corresponds to an input/output (IO) operation type and a second dimension corresponds to an IO size; provision a first set and a second set of the one or more partitions to cache write IO operations; assign each IO operation of an IO workload to one or more of the partitions based on a similarity between a size of each IO operation and the configured caching IO operation size of each partition; cluster an anticipated IO workload into groups of IO operations corresponding to the first and second dimensions; determine cache sizes required to cache each of the groups of IO operations; and partition and size the one or more global caches into the one or more cache partitions based on the groups of IO operations and determined sizes.

2. The apparatus of claim 1, wherein the IO operation type includes at least one of: a read operation and a write operation.

3. The apparatus of claim 1 further configured to portion the IO operations into one or more bins, wherein the bins are sized based on anticipated IO operation sizes.

4. The apparatus of claim 1, wherein the second set of the partitions are mirrored cache partitions of the first set.

5. The apparatus of claim 4 further configured to provision a third set of the one or more cache partitions as unmirrored caches adapted to cache read IO operations.

6. The apparatus of claim 5 further configured to provision each of the first, second, and third sets of partitions with one or more cache bins, wherein each bin is a unit of memory smaller than a partition.

7. The apparatus of claim 6 further configured to anticipate IO workloads of each of the partitions using one or more machine learning techniques.

8. A method comprising:
dynamically partitioning and sizing one or more global caches into one or more cache partitions based on anticipated input/output (IO) workloads, wherein the one or more global caches include a primary cache and a backup cache; and
establishing the cache partitions to include one or more write cache memory partitions and a read cache memory partition wherein the one or more cache partitions are partitioned along at least two dimensions, wherein a first dimension corresponds to an input/output (IO) operation type and a second dimension corresponds to an IO size; provisioning a first set and a second set of the one or more partitions to cache write IO operations; assigning each IO operation of an IO workload to one or more of the partitions based on a similarity between a size of each IO operation and the configured caching IO operation size of each partition; clustering an anticipated IO workload into groups of IO operations corresponding to the first and second dimensions; determining cache sizes required to cache each of the groups of IO operations; and partitioning and sizing the one or more global caches into the one or more cache partitions based on the groups of IO operations and determined sizes.

9. The method of claim 8 further comprising portioning the IO operations into one or more bins, wherein the bins are sized based on anticipated IO operation sizes.

10. The method of claim 8, wherein the IO operation size is at least one of: 128 kilobytes, 64 kilobytes, and 16 kilobytes.

11. The method of claim 8, wherein the second set of the partitions are mirrored cache partitions of the first set.

12. The method of claim 11 further comprising provisioning a third set of the one or more cache partitions as unmirrored caches adapted to cache read IO operations.

13. The method of claim 12 further comprising provisioning each of the first, second, and third sets of partitions with one or more cache bins, wherein each bin is a smaller unit of memory than a partition.

14. The method of claim 13 further comprising anticipating IO workloads of each of the partitions using one or more machine learning techniques.

* * * * *